United States Patent
Thill et al.

(10) Patent No.: US 10,049,316 B2
(45) Date of Patent: Aug. 14, 2018

(54) MOBILE DEVICE WITH INDEPENDENT BATTERY AND RADIOFREQUENCY COMMUNICATION INTERFACE

(75) Inventors: Michel Thill, Les Clayes-sous-Bois (FR); Pierre Gravez, Nogent sur Marne (FR); Matthieu Antoine, Boulogne (FR)

(73) Assignee: GEMALTO SA, Meudon (FR)

( * ) Notice: Subject to any disclaimer, the term of this patent is extended or adjusted under 35 U.S.C. 154(b) by 717 days.

(21) Appl. No.: 13/636,376

(22) PCT Filed: Mar. 16, 2011

(86) PCT No.: PCT/EP2011/053980
§ 371 (c)(1),
(2), (4) Date: Sep. 21, 2012

(87) PCT Pub. No.: WO2011/117129
PCT Pub. Date: Sep. 29, 2011

(65) Prior Publication Data
US 2013/0010666 A1    Jan. 10, 2013

(30) Foreign Application Priority Data
Mar. 22, 2010  (EP) ...................................... 10305280

(51) Int. Cl.
*G06K 19/07*        (2006.01)
*G06K 19/077*       (2006.01)
*H04W 52/02*        (2009.01)

(52) U.S. Cl.
CPC ... *G06K 19/0705* (2013.01); *G06K 19/07749* (2013.01); *H04W 52/028* (2013.01);
(Continued)

(58) Field of Classification Search
CPC ............. H04W 52/02; H04W 52/0216; H04W 52/0229; H04W 84/12; H04W 84/18;
(Continued)

(56) References Cited

U.S. PATENT DOCUMENTS 7,242,972 B2 *  7/2007  Harris ..................... H04W 8/22
                                                    455/434
2004/0019812 A1 *  1/2004  Chen et al. ................... 713/300
(Continued)

FOREIGN PATENT DOCUMENTS

| WO | WO200161872 A2 | 8/2001 |
| WO | WO2005078644 A1 | 8/2005 |
| WO | WO2008104567 A1 | 9/2008 |

OTHER PUBLICATIONS

PCT/EP2011/053980 International Search Report, dated Apr. 11, 2011, European patent office, P.B. 5818 Patentlaan 2, NL-2280 HV Rijswijk.

*Primary Examiner* — Ian N Moore
*Assistant Examiner* — Ronald h Davis
(74) *Attorney, Agent, or Firm* — The Jansson Firm; Pehr B. Jansson

(57) ABSTRACT

The invention is aimed at optimizing the life of the power supply of mobile equipment with a radiofrequency communication interface by switching off the power to it when it reaches a given state. A mobile device (102) has a battery (206), a radiofrequency circuit (201) allowing the mobile device (102) to exchange information with a host device (101). The mobile device (102) comprises an electronic switch (202) connected between the battery (206) and at least the radiofrequency circuit (201), where the switch makes it possible to supply power or not to the radiofrequency circuit. A power control circuit (203) is capable of controlling the electronic switch (202) so that it ceases to power the radiofrequency circuit as soon a break in communication is detected.

11 Claims, 3 Drawing Sheets

(52) U.S. Cl.
CPC .... *H04W 52/0241* (2013.01); *H04W 52/0254* (2013.01); *Y02D 70/142* (2018.01); *Y02D 70/144* (2018.01); *Y02D 70/162* (2018.01); *Y02D 70/166* (2018.01)

(58) Field of Classification Search
CPC ........... H04W 52/028; H04W 52/0241; H04W 52/0254; G06K 19/0705; G06K 19/07749; Y02D 70/142; Y02D 70/144; Y02D 70/162; Y02D 70/166
See application file for complete search history.

(56) References Cited

U.S. PATENT DOCUMENTS

| | | |
|---|---|---|
| 2004/0025065 A1 | 2/2004 | Lou |
| 2004/0204175 A1 | 10/2004 | Karaoguz |
| 2004/0235537 A1 | 11/2004 | Koga |
| 2005/0156711 A1* | 7/2005 | Aljadeff ................... G01S 5/06 340/10.34 |
| 2007/0015465 A1* | 1/2007 | Giroud .............. G06K 19/0705 455/41.2 |
| 2007/0057073 A1* | 3/2007 | Mamba .................... G06F 1/26 235/492 |
| 2007/0263574 A1* | 11/2007 | Lu et al. ....................... 370/338 |
| 2008/0007905 A1* | 1/2008 | Wilcox et al. ................ 361/681 |
| 2009/0257369 A1* | 10/2009 | Igarashi et al. .............. 370/311 |
| 2009/0272796 A1* | 11/2009 | Ong .............................. 235/379 |
| 2010/0052775 A1* | 3/2010 | Mizuno et al. ............... 327/541 |
| 2010/0052928 A1* | 3/2010 | Tabib ............................ 340/653 |
| 2010/0122008 A1* | 5/2010 | Goss et al. ................... 710/264 |
| 2010/0232331 A1* | 9/2010 | Son et al. ..................... 370/311 |
| 2010/0327945 A1* | 12/2010 | Caruana ............ G06K 19/0701 327/427 |
| 2012/0313758 A1* | 12/2012 | Savarese ........... G06K 7/10079 340/10.1 |

\* cited by examiner

MOBILE DEVICE WITH INDEPENDENT BATTERY AND RADIOFREQUENCY COMMUNICATION INTERFACE

BACKGROUND OF THE INVENTION

The invention relates to a mobile device with an independent battery and a radiofrequency communication interface. More particularly, the invention relates to a piece of equipment with a small battery, such as for example an access card.

A communicating card device will be used as a concrete example of the embodiment of the invention. However, any other mobile device, which has an independent power supply and a radiofrequency communication interface, will be capable of implementing the invention described below.

The state of the art for a communicating card devices makes it possible, among other things, for a user to be authenticated by a remote computer system, such as for example a personal computer, a mobile telephone, a personal digital assistance or a device with which the user needs to interact, in a limited perimeter.

That authentication system comprises a mobile device that is carried by the user and is made up of the following:
  A smart card that contains the user's secrets in a secure manner,
  An electronic card holder with an interface for an ISO7816 smart card and a radiofrequency interface, e.g. of the Bluetooth type.

Such equipment makes it possible to relay data between the smart card and the remote computer system. In this example, it is assumed that the remote computer system has a Bluetooth radiofrequency interface.

One of the key criteria of a mobile device with an independent power supply with a radiofrequency interface is its independence. The radiofrequency interfaces available (Wi-Fi, Bluetooth etc.) use techniques that are designed to increase the independence of such devices. However, the radiofrequency interface is not completely shut down and thus consumes energy regardless of its state. But there are states in which the radiofrequency interface can be put out of operation, in order to increase the life of the power supply.

Besides, the density of wireless equipment, for example in office environments, can help shorten the life of the power supply. That is because even when a mobile device is not in an active communication session, it interacts with the environment by listening so as to detect any request for communication. Such listening also consumes power, and that power consumption is not negligible.

SUMMARY

The invention makes it possible to optimise the life of the power supply of a mobile device with a radiofrequency communication interface by switching off the power supply to it when it reaches a given state where the radiofrequency communication interface is no longer used (typically when the connection is lost, or when the mobile equipment has not been able to initiate connection within the set time). The user must then take positive action to restart the radiofrequency communication interface.

The invention is a mobile device with an independent battery and a radiofrequency circuit, where the radiofrequency circuit allows the mobile device to exchange information with a host device. The mobile device is differentiated by an electronic switch connected between the battery and at least the radiofrequency circuit, where the switch makes it possible to supply power to or not to the radiofrequency circuit, and also by a power supply control circuit that is capable of controlling the electronic switch so that it ceases to power the radiofrequency circuit as soon as a break in communication is detected.

Preferentially, the electronic switch can connect the battery to the totality of the circuits of the mobile device with the exception of the control circuit. The control circuit may comprise a starting circuit that switches the switch to make it power the radiofrequency circuit for a predetermined duration regardless of the fact that communication is under way or not. The radiofrequency circuit may be compliant with one of the following standards IEEE802.15.3, IEEE802.15.4 or IEEE802.11. The mobile device may be an electronic card. The device may comprise a smart card reader and a smart card, where the radiofrequency circuit transcodes the information received by the electronic card into a protocol understandable by the smart card.

In another aspect, the invention is a method for managing the power consumption of a mobile communicating device. The said method comprises a step where the power supply to the circuits of the mobile device is switched off in the event of a break in the communication established by a radiofrequency circuit of the said mobile device.

Preferably, the switching off of the power supply may be limited to the radiofrequency circuit. The method may comprise a starting up step during which the radiofrequency circuit is powered for a predetermined duration independently of the establishment of radiofrequency communication. The predetermined duration may start following action by a user of the mobile device.

BRIEF DESCRIPTION OF THE DRAWINGS

The invention will be better understood in the description below, by reference to the drawings attached, where.

DETAILED DESCRIPTION

Figure 1:
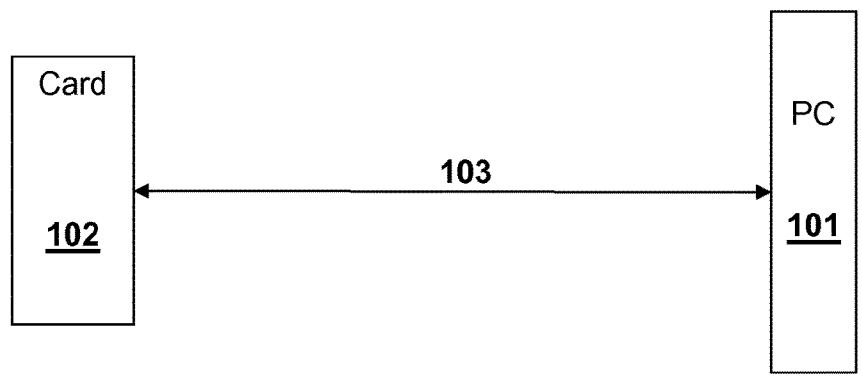
FIG. 1 presents the invention in its environment.

FIG. 1 represents a mobile electronic device 102 in its environment of use. The mobile device may, for example, be a card designed to communicate by radiofrequency 103 with a computer 101. For example, the card is designed for a person who wishes to be authenticated by a computer.

Figure 2:
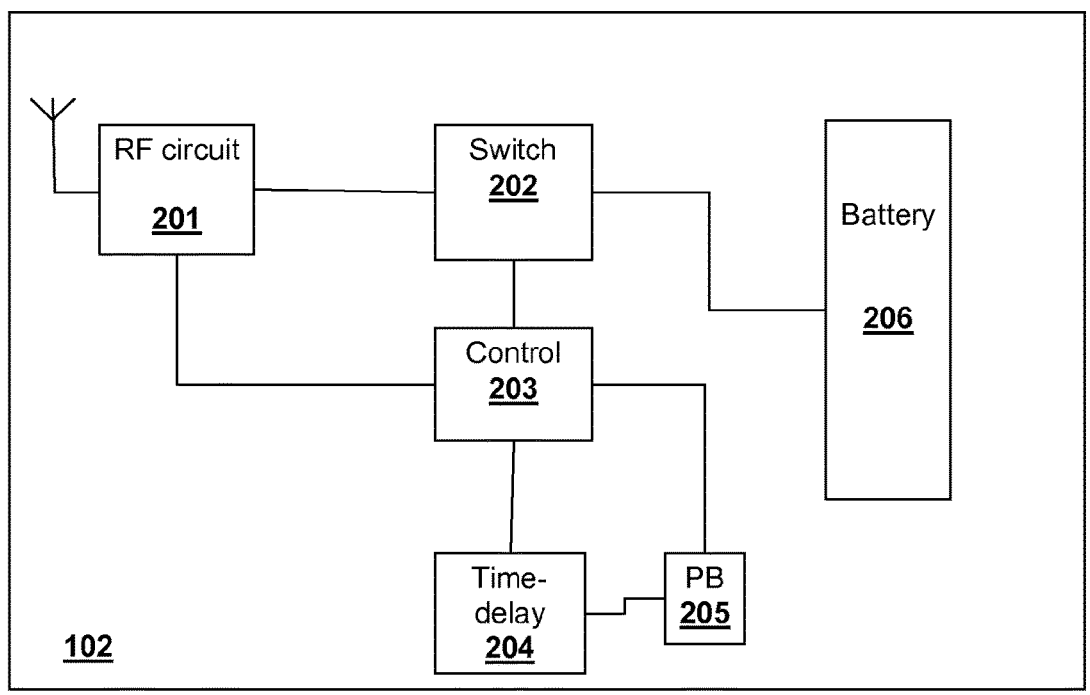
FIG. 2 presents a mode of embodiment of the invention.

An example of functional embodiment of the card has been explained in FIG. 2. For example, the card may comprise a radiofrequency circuit 201, a controlled switch 202, a control circuit 203, a timing circuit 204, a pushbutton 205 and a battery 206.

The radiofrequency circuit 201 comprises a communication interface with a range between approximately ten and hundred meters. The radiofrequency circuit may also comprise many other elements such as for instance a data processing circuit. It goes without saying that the card may also comprise other non-illustrated elements such as for example a smart card reader where the power supply is shared or not with the radiofrequency circuit. The radiofrequency interface is, for example, compliant with one of the following standards: Bluetooth (IEEE 802.15.3), Zigbee (IEEE 802.15.4), Wi-Fi (IEEE802.11) or others. The radiofrequency circuit 201 comprises an input/output that provides the connection status of the communication interface. That input/output may be present in some communication circuits or may be achieved with software on the general-purpose input/output (GPIO) of a component.

The controlled switch 202 is, for instance a power transistor with low leakage current or any other type of electronic switch with an activation input. As part of the invention, that controlled switch 202 makes it possible to manage the power supply of the radiofrequency circuit 201 depending on the information received by the control circuit 203.

The pushbutton 205 allows the user to manually initiate the connection of the card 102 with a PC 101 by sending that connection initialisation information to the control circuit 203. Pressing the pushbutton 205 also initialises the timing circuit 204.

The timing circuit 204 is a circuit that makes it possible to indicate that a predefined time has elapsed after the pushbutton 205 is pressed. Many monostable circuits with rated durations are available to the person of the art. That timing circuit 204 has an output with a status that indicates if the predefined duration has been reached or not. That information is sent to the control circuit 203.

The control circuit 203 is a circuit that is designed to interpret the information received by the radiofrequency interface 201, the timing circuit 204 and the pushbutton 205 to then control the controlled switch 202. It is, for example, made up of logical gates that make up a state machine that takes account of the information received at the input to then control a toggle that provides information to the controlled switch 202 in order to switch off or not the power supply to the communication interface 201. The control circuit 203 preferentially operates as shown in the chart in FIG. 3.

The battery 206 is a small battery and thus has a small capacity, such as for example of the lithium ion type or lithium polymer type.

Figure 3:
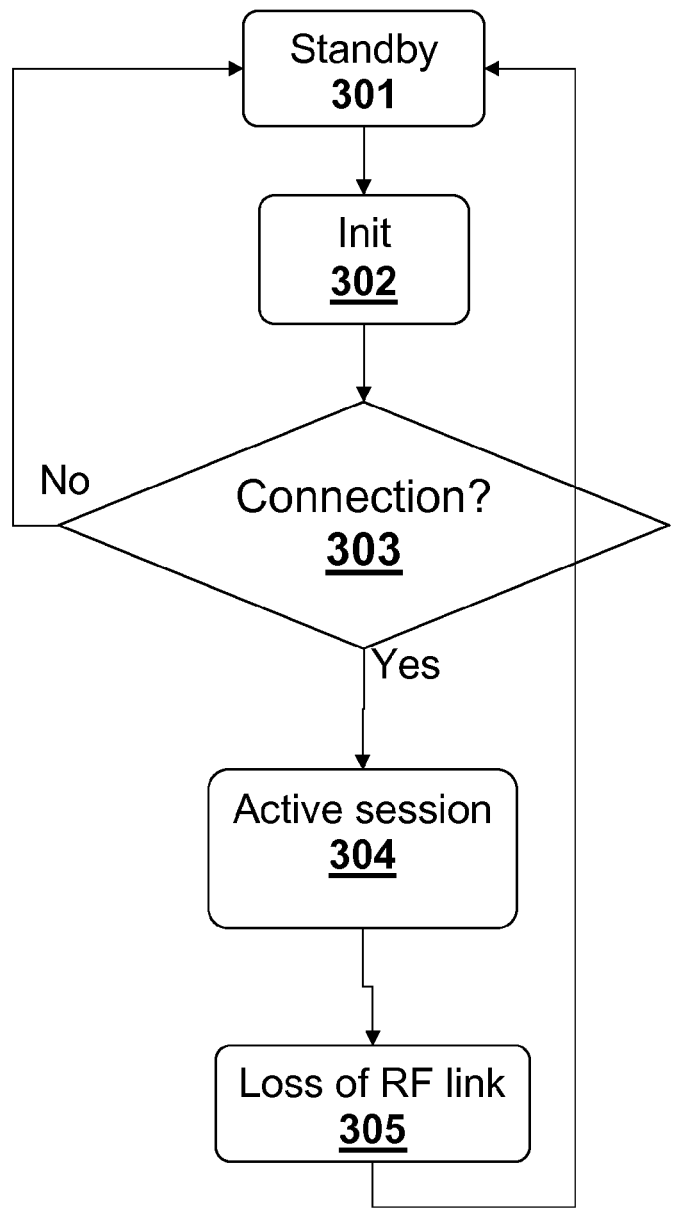
FIG. 3 presents the working of the invention.

FIG. 3 presents the working of the invention. The first step 301 is a step during which the card is in standby mode. The control circuit 203 is powered and controls the controlled switch 202 to switch off the power supply to the radiofrequency circuit 201.

Step 302 is a step where communication is initiated between the card 102 and a host that has to authenticate it, for example the PC 101. Communication is initiated by the user by pressing the pushbutton 205. Pressing the pushbutton sets off a predetermined time period and the control circuit powers the radiofrequency circuit 201. During that step 302, the radiofrequency circuit 201 opens a listening channel to identify communication. The step lasts till the end of a predetermined duration. The predetermined duration is greater than the time required to detect that a channel is open and to log onto the channel. The timing circuit 204 indicates to the control circuit 203 to maintain the power to the radiofrequency circuit 201 by sending the appropriate information to the controlled switch 202.

Step 303 is the end of the predetermined time. If no communication is made during that duration, then the power supply of the radiofrequency communication circuit 201 is switched off and the device goes back to step 301. If a connection is made during the predetermined duration, then the control circuit 203 maintains the power supply by sending appropriate information to the controlled switch 202.

Step 304 corresponds with the progress of an active session resulting from the connection established in the previous step. During that step 304, the card 102 and the remote host 101 exchange information through the radiofrequency link 103.

If the radiofrequency connection is broken, then the device moves on to step 305. The causes of that break in connection may be many: remote distance too great between the card 102 and the remote host 101, switching off of the radiofrequency communication interface of the remote host 101, etc. That break in connection is indicated by the radiofrequency circuit 201, which transmits the information of a break in connection to the control system 203. During that step 305, the control circuit 203 indicates to the controlled switch 202 to switch off the power supply of the radiofrequency circuit 201. Then, the control circuit 205 goes back to the standby step, 301.

Figure 4:
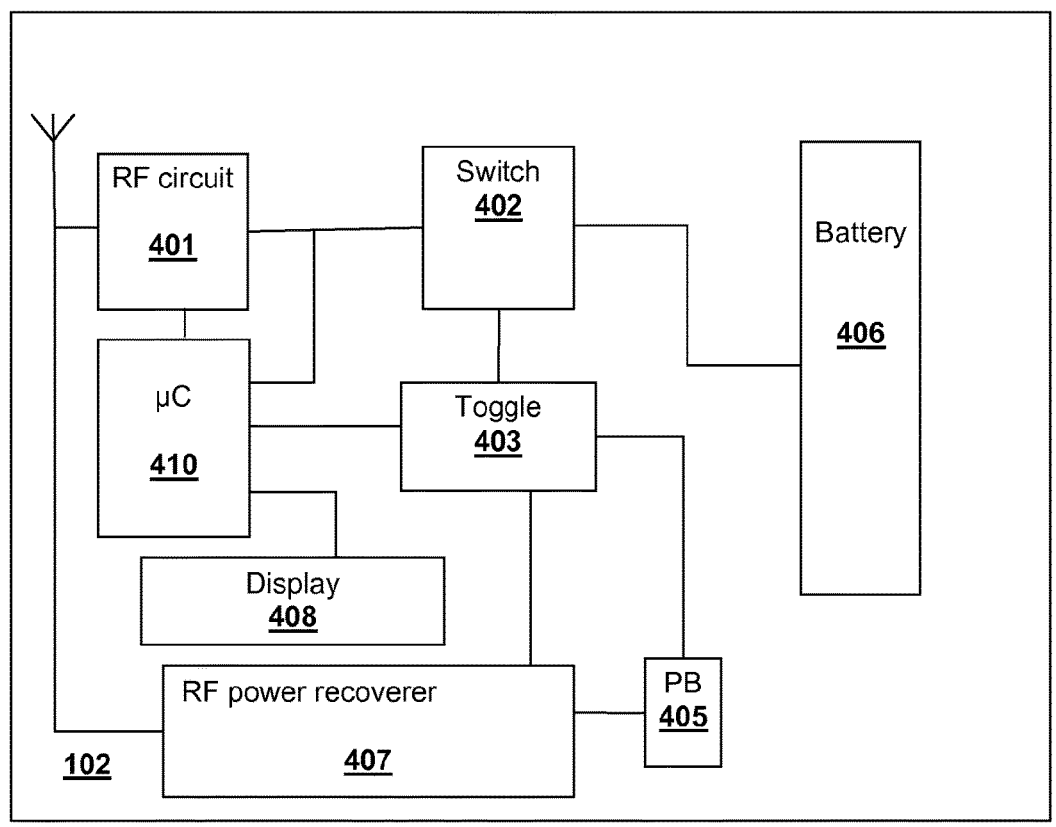
FIG. 4 presents a variant of embodiment of the invention.

A second example of the functional embodiment of the card has been detailed in FIG. 4. The card is then materialised by a smart card in ISO format, which may for example include a display, where the card preferably comprises:

A microcontroller 410 corresponding with a conventional smart card circuit in accordance with standard ISO7816, where such a circuit has very low consumption in standby mode 410. The latter is advantageously connected by its general-purpose inputs/outputs to devices such as for instance the control interface of a display 408, a toggle 403, a pushbutton 405 and a controlled switch 402 connected to a battery 406 identical to the battery 206 in FIG. 2.

A radiofrequency interface 401 with functions and properties identical to the circuit 201 of FIG. 2. That circuit may or may not be integrated on the same monolithic substrate as the microcontroller 410. If it is not on the same substrate, data are exchanged with the circuit 401 via the general-purpose input/outputs of components.

A circuit for the recovery of electrical power from the ambient radiofrequency field 407 caught by the antenna. That circuit, which may for instance be composed of a rectifier arrangement, a diode loading pump and a voltage regulator, charges a high-value reservoir capacitor. The circuit known to the person of the art for the electrical power supply of UHF electronic tags is capable of delivering power of a few tens of microwatts over a duration of approximately 10 seconds when the electrical field is sufficient.

In this example, the control functions carried out by the circuit 203 are provided in part by the toggle 403 and by the microcontroller 410, where the microcontroller 410 operates as described in the chart in FIG. 3, where the toggle allows starting up with very low consumption. Also, the timing circuit of the circuit 204 of FIG. 2 is programmed in the executable code and integrated into the very low consumption microcontroller 410. When the user presses the pushbutton 402, that makes it possible to toggle the toggle 403 into a state that makes it possible to make the controlled switch 402 conduct, and to power the circuits 401 and 410 from the battery. The starting up programs of the circuits 401 and 410 are also initialised, and the time period is started when the microcontroller 410 starts, and with the attempt to connect with the terminal 101.

The use of a toggle 403 makes it possible to have to power only a very small number of transistors to initiate conduction by the switch 402. In that way, the power recovery circuit 407 can power these few transistors by using the very low power of the electromagnetic field used for radio communication. Such a solution further makes it possible to not use the battery 406 to power that toggle 403, thus reducing the leakage currents in standby mode.

The invention claimed is:

1. A mobile device with the capability of turning off power supply when there is a break in communication, comprising:

an independent battery;
a radiofrequency circuit connected to a power supply circuit, where the radiofrequency circuit allows the mobile device to exchange information with a host device through a radiofrequency link, the radiofrequency circuit operable to detect a break in the radiofrequency link to the host device and in response to detecting a break in the radiofrequency link, transmitting information indicative of the break in the radiofrequency link to the power supply circuit;
an electronic switch connected between the battery and at least the radiofrequency circuit, where the switch selectively switches on or off power to the radiofrequency circuit;
wherein the power supply control circuit:
controls the electronic switch so that the electronic switch switches on power to the radiofrequency circuit for a predetermined period in response to an activation event,
ceases to power the radiofrequency circuit after the predetermined period if no radiofrequency link is detected,
maintains power to the radiofrequency circuit after the predetermined period as long as a communications session is active on the radiofrequency link, and
triggered by receiving from the radiofrequency circuit, after the predetermined period, information indicative of a break in the active radiofrequency link, ceases to power the radiofrequency circuit.

2. The device according to claim 1, in which the electronic switch connects the battery to all the circuits of the mobile device with the exception of the control circuit.

3. The device according to claim 1, in which the control circuit comprises a starting up circuit which toggles the switch to switch on power to the radiofrequency circuit during a predetermined duration regardless of whether communication is under way or not.

4. The device according to claim 3, in which the radiofrequency circuit establishes radiofrequency communication with the host device.

5. The device according to claim 1, in which the radiofrequency circuit complies with one of the following standards: IEEE802.15.3, IEEE802.15.4, or IEEE802.11.

6. The device according to claim 1, in which the mobile device is an electronic card.

7. The device according to claim 6, in which the device comprises a smart card reader and a smart card, and in which the radiofrequency circuit transcodes the information received by the smart card into a protocol understandable by the smart card.

8. A method for operating a power supply control circuit and a radiofrequency circuit of a communicating mobile device using a radio frequency link for communicating with a host device, to manage a power supply to the radiofrequency circuit, the method comprising:
a step of operating the power supply control circuit to switch on the power supply to the radiofrequency circuit for a predetermined period in response to an activation event;
a step of operating the power supply control circuit to cause the power supply to cease powering the radiofrequency circuit after the predetermined period if no radiofrequency link is detected;
operating the power supply control circuit to cause the power supply to maintain power to the radiofrequency circuit after the predetermined period as long as a communications session is active on the radiofrequency link;
operating the radiofrequency circuit to detect a break in the radiofrequency link to the host device and in response to detecting a break in the radiofrequency link, transmitting information indicative of the break in the radiofrequency link to the power supply circuit; and
operating the power supply control circuit, triggered by receiving from the radiofrequency circuit, after the predetermined period, information indicative of a break in the active radiofrequency link after the predetermined period, to cause the power supply to switch off power supplied to the radiofrequency circuit.

9. The method according to claim 8, in which the switching off of the power is limited to the radiofrequency circuit.

10. The method according to claim 8, which comprises a starting up step during which the radiofrequency circuit is powered during a predetermined duration independently of the establishment of radiofrequency communication.

11. The method according to claim 10, in which the predetermined duration starts following action by a user of the mobile device.

* * * * *